(No Model.)

J. NUTTALL.
PIPE COUPLING.

No. 342,305. Patented May 18, 1886.

WITNESSES
F. L. Ourand
Edward Stanton

Joshua Nuttall,
INVENTOR,
By Louis Bagger & Co.
Attorney

UNITED STATES PATENT OFFICE.

JOSHUA NUTTALL, OF PITTSBURG, PENNSYLVANIA, ASSIGNOR OF ONE-HALF TO JOSHUA RHODES, OF SAME PLACE.

PIPE-COUPLING.

SPECIFICATION forming part of Letters Patent No. 342,305, dated May 18, 1886.

Application filed October 30, 1885. Serial No. 181,377. (No model.)

*To all whom it may concern:*

Be it known that I, JOSHUA NUTTALL, a citizen of the United States, and a resident of Pittsburg, in the county of Allegheny and State of Pennsylvania, have invented certain new and useful Improvements in Pipe-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1:
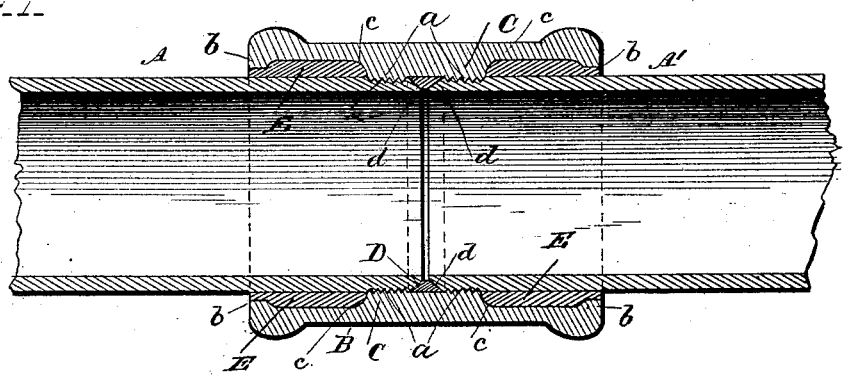
Figure 2:
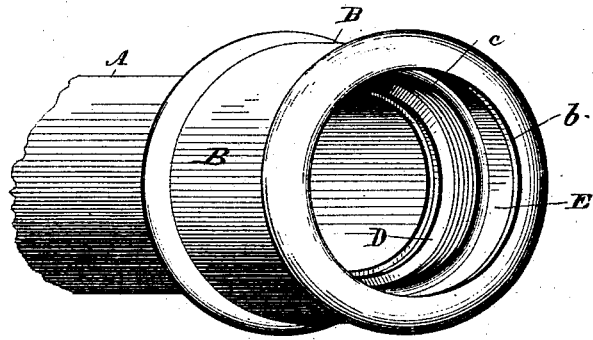
Figure 3:
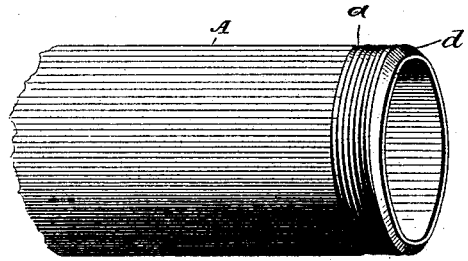
Figure 4:
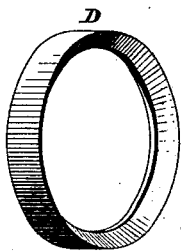

Figure 1 is a longitudinal sectional view of my improved pipe-coupling. Fig. 2 is a perspective view of the coupling-sleeve with one end of pipe inserted into it. Fig. 3 is a perspective view of one end of one of the pipe-sections to be coupled, adapted for use with my improved coupling; and Fig. 4 is a perspective view of the washer used with this coupling.

Similar letters of reference indicate corresponding parts in all the figures.

My invention has relation to permanent pipe-couplings or pipe-joints, and is intended more particularly to be used on pipe-lines for natural gas. As is well known, it has been found difficult to construct an absolutely perfect coupling for natural-gas conduits, owing to the high pressure of the gas and its peculiar nature, which will cause it to leak through couplings which would be perfectly steam-tight and suitable in every respect for ordinary purposes.

To this end my invention consists in the improved joint, which will be hereinafter more fully described and claimed.

In the accompanying drawings, the letters A and A' denote two ends of the pipe-sections which are to be coupled. These ends are screw-threaded, as shown at $a$; but the threads extend down the pipe only far enough to cause it to bind in the coupling-sleeve, (which is shown at B,) one of my objects being to avoid weakening the pipe by threading it too much at the point where it is to be coupled.

The sleeve B is constructed with an inside annular offset or shoulder, C, beveled at $c\ c$, and threaded between the two bevels. The pipes A and A' are adapted to fit with their threaded ends into the reduced middle part of the sleeve, formed by its central offset, C, and are beveled, as shown at $d$, to cause them to seat or press firmly against the interposed washer or annular packing D, made of lead or other suitable material, and dovetailed in cross-section, so as to fit the two bevels $d\ d$. Thus, when the two sections of pipe are inserted into the sleeve and fastened in the interior threaded part, C, their two beveled ends will compress the washer D from opposite sides, and thus form a tight joint.

The sleeve B is constructed at each end with an inwardly-projecting annular flange, $b$, of such a size that after the pipe-section has been inserted into the sleeve and screwed home there will be left a narrow annular space encircling the pipe between it and the flange $b$, opening up into the annular chamber, which is closed at the inner end by the beveled offset or shoulder C. This chamber is packed with melted lead, cement, or other suitable material, (shown at E,) which is prevented from coming out by flange $b$.

It will be seen that, practically, five joints are formed within this coupling—viz., one central joint at the packing ring or washer D in the middle of the sleeve, another at each end of the sleeve, formed by the central offset, C, and, finally, one at each extreme end of the sleeve, formed by the inwardly-projecting annular flange $b$, which confines the packing E. Thus it will be seen that it is almost impossible for a leak to occur, no matter how great the pressure of the gas or other fluid conducted through the pipe.

Having thus described my invention, I claim and desire to secure by Letters Patent of the United States—

In a pipe-coupling, a coupling-sleeve having a central inwardly-projecting threaded offset with beveled shoulders, and provided at opposite ends with an inwardly-turned annular flange, in combination with the threaded pipe-sections screwed into the central projection of the sleeve, the packing ring or washer interposed between the meeting ends of said pipe-sections, and the packing at opposite ends of the sleeve, confined between the beveled shoulders of the central offset of the same and the annular flanges at its opposite ends, substantially as and for the purpose set forth.

In testimony that I claim the foregoing as my own I have hereunto affixed my signature in presence of two witnesses.

JOSHUA NUTTALL.

Witnesses:
LOUIS BAGGER,
ARTHUR L. MORSELL.